United States Patent

[11] 3,591,715

| [72] | Inventors | David Rubin<br>Riverside;<br>John B. Seybold, Corona, both of, Calif. |
|---|---|---|
| [21] | Appl. No. | 865,709 |
| [22] | Filed | Oct. 13, 1969 |
| [45] | Patented | July 6, 1971 |
| [73] | Assignee | The United States of America as represented by the Secretary of the Navy |

[54] VARIABLE WIDTH VIDEO EDGE DETECTOR
2 Claims, 7 Drawing Figs.

[52] U.S. Cl. .................................................. 178/7.1,
178/6, 343/5 MM, 356/158, 250/220 SP
[51] Int. Cl. ........................................................ H04n 1/02
[50] Field of Search........................................... 178/6;
356/158; 343/5 MM, 7 TA; 250/220 SP, 7.1

[56] References Cited
UNITED STATES PATENTS

| 3,049,588 | 8/1965 | Barnett.......................... | 178/6 |
| 3,379,829 | 4/1908 | Gambrell et al. ............. | 178/6 |
| 3,527,533 | 9/1970 | Hook et al. ..................... | 178/7.1 |

*Primary Examiner*—Robert L. Griffin
*Assistant Examiner*—Richard P. Lange
*Attorneys*—R. S. Sciascia and J. M. St. Amand

ABSTRACT: A device, used with an analog video correlation, for edge detecting the video input from two TV cameras to immediately discern the time correlations peak from past or future partial correlation peaks providing dependable real time map matching.

PATENTED JUL 6 1971

DAVID RUBIN
JOHN B. SEYBOLD
*INVENTORS*

BY *J. M. St. Amand*

*ATTORNEY*

DAVID RUBIN
JOHN B. SEYBOLD
INVENTORS

BY J. M. St. Amand
ATTORNEY

3,591,715

VARIABLE WIDTH VIDEO EDGE DETECTOR

The invention herein described may be manufactured and used by or for the Government of the United States of America for governmental purposes without the payment of any royalties thereon or therefor.

BACKGROUND OF THE DISCLOSURE

TV map matching techniques involve moving a live scene electrically or mechanically over a reference scene while continually multiplying the two video outputs. This multiplied video is then integrated to produce the corresponding correlation coefficient. When two scenes are similar a correlation peak results. Identical scenes produce larger correlation peaks. The problem is then one of finding actual position without moving through all correlation peaks and then choosing the largest one.

U.S. Pat. application, Ser. No. 789,086, filed Jan. 2, 1969 for Analog Video Correlator, described a method of detecting edges, thereby making nonidentical scenes less likely to give large correlation outputs. However, in certain situations, this method could also give erroneous results as will be hereinafter described.

Device is to be used as part of an analog video correlator. The device first edge detects the video inputs from two synchronized TV cameras. The pulses derived from these edges are automatically widened so that their integrated output will be the same for any scene.

The widened edge pulses from both cameras are then sent through and AND gate. Irregardless of scene content, two perfectly correlated scenes will develop the same DC voltage when the output of the AND gate is integrated.

An object of the invention, therefore, is to provide a dependable map matching device. Another object is to provide a variable width video edge detector for improved map matching techniques.

Other objects and many of the attendant advantages of this invention will become readily appreciated as the same becomes better understood by reference to the following detailed description when considered in connection with the accompanying drawings wherein.

Figure 3:
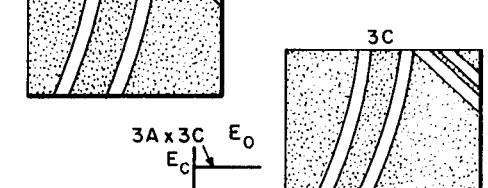

FIGS. 3A, 3B, and 3C show the results of multiplied video edge pulses.

Figure 4:
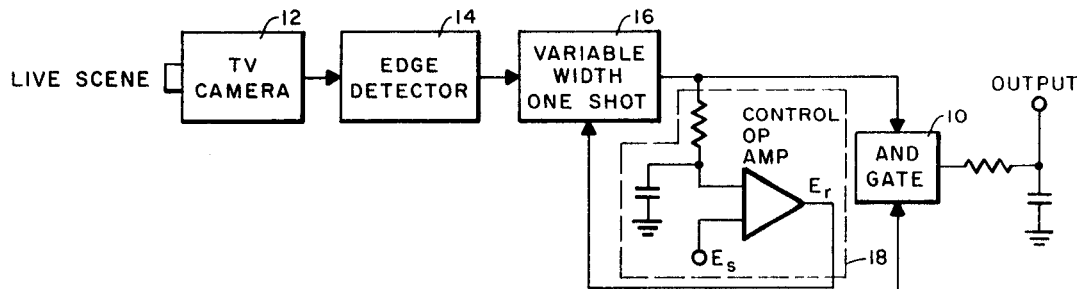

FIG. 4 shows a schematic diagram of the device of the present invention.

Figure 5:
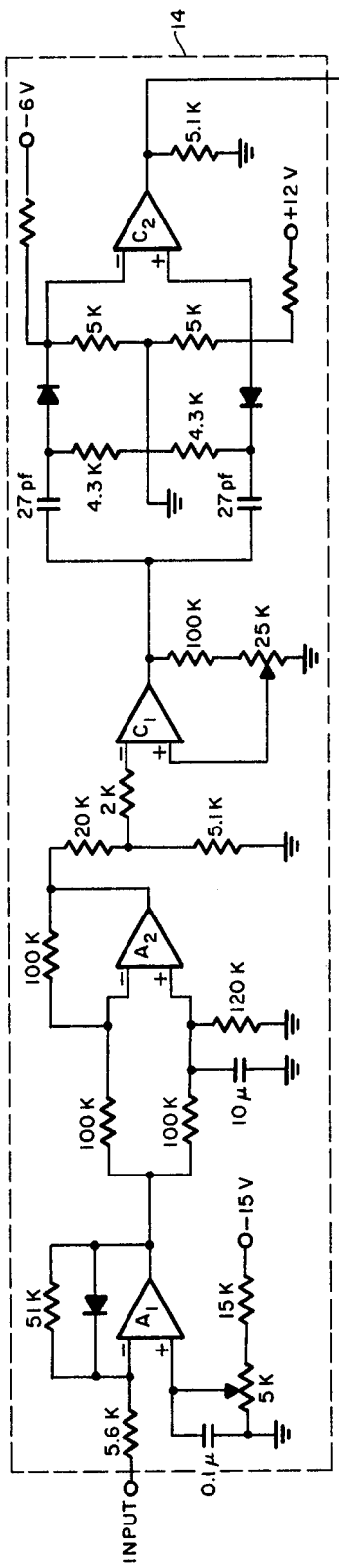

FIG. 5 shows one embodiment of a circuit diagram for an embodiment of the invention giving component values.

Figure 6:
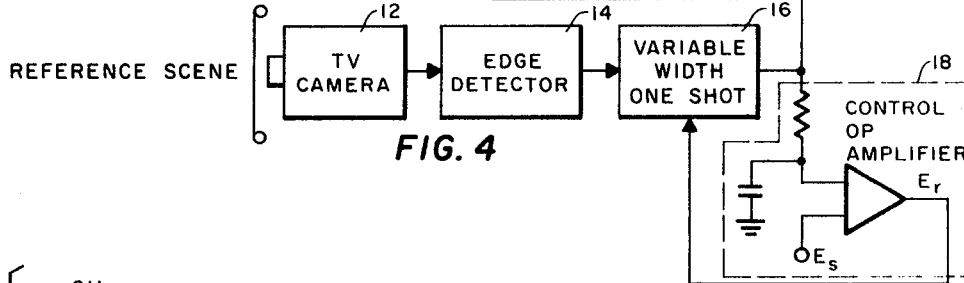
Figure 6:
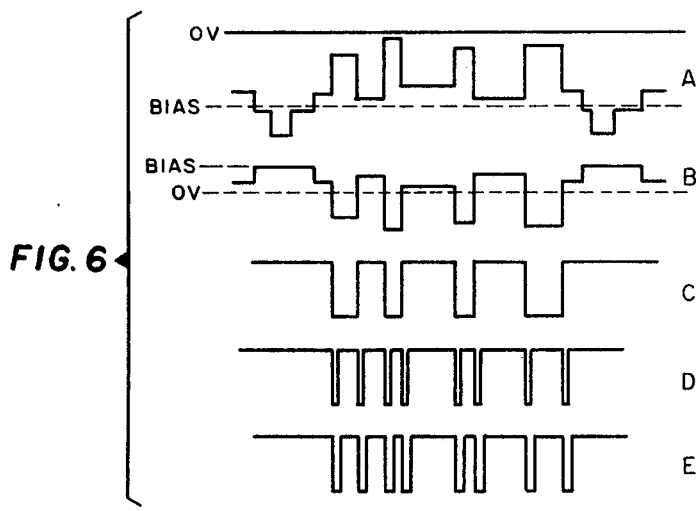

FIG. 6 illustrates signal pulses at various operations of FIG. 5.

Figure 7:
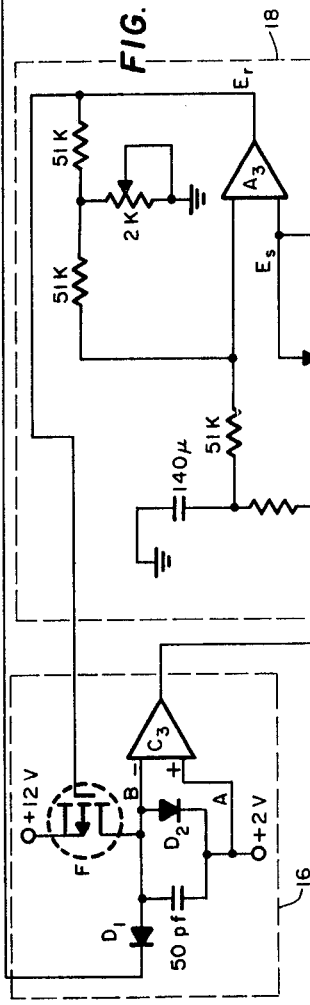
Figure 7:
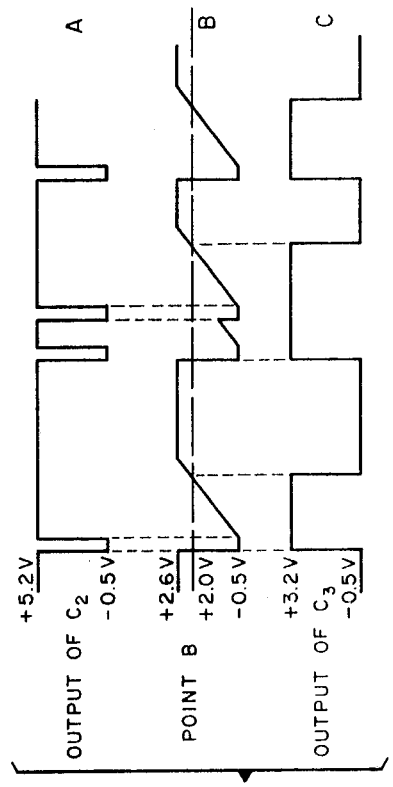

FIG. 7 illustrates signal pulses at various points in the circuit of FIG. 5.

DESCRIPTION OF THE PREFERRED EMBODIMENT

Figure 1:
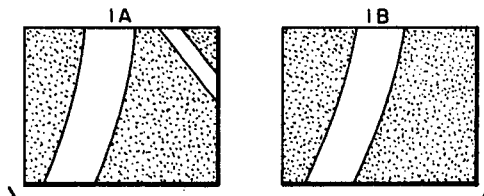
FIGS. 1A and 1B show two different but similar video scenes.
Figure 2:
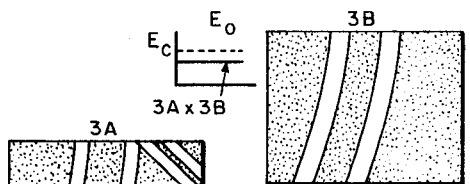
FIGS. 2A and 2B shows edge detection of the video scenes of FIGS. 1A and 1B respectively.
Figure 2:
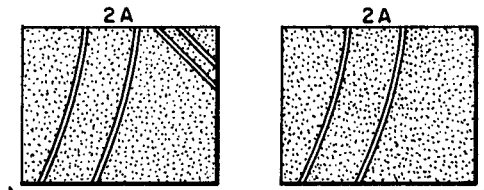

Consider the two scenes of FIGS. 1A and 1B, both of which are similar, and both edge detection and total video matching would give a large correlation peak. However, this peak can be shown to be an incorrect peak by the following method: first, edge detect both of the pictures of FIGS. 1A and 1B as shown in FIGS. 2A and 2B; second, vary the width of the edges so that each scene produces a fixed amount of voltage when the "white" signal is integrated as in FIGS. 3A and 3B; then multiply the video pulses from the outputs of the two widened edge detectors.

It is apparent that the integrated voltage output from the multiplied pulses will not be as large as would be obtained from identical edge pictures FIGS. 3A and 3C. Further, any two identical pictures will always give the same voltage $E_c$. Hence true correlation can be said to occur any time that $E_c$ appears at the output.

The essential components of the invention are shown in FIG. 4. Two substantially identical channel circuits are each connected to an AND gate 10. Both of the channel circuits consist of a television camera 12, and edge detector 14, a variable width one shot (multivibrator) 16, such as an operational amplifier monostable circuit, and a control operational amplifier circuit 18. One television camera 12 views a reference scene and the other television camera views the live scene. Edge detectors detect the edges of video pulses.

The input of each variable width one shot 16 from edge detectors 14 consists of negative going $0.2\mu$ sec. pulses, for example, occurring whenever the TV camera scans through a significant change in light intensity. The variable width one shot 16 produces a pulse for every input pulse, the width being dependent on the variable voltage $E_r$ at the output from the control operational amplifier circuit 18. One input to the control operational amplifier 18 is a set voltage $E_s$. The other input is the integrated (e.g. one-half second) output of the variable width one shot 16. The one shot 16 functions as an active feedback device between the output and input of the operational amplifier 18. This feedback forces the integrated one shot output to be very close to $E_s$. Therefore all pictures are widened to the extent that $E_s$ is produced at the integrated output. In other words, operational amplifier circuit 18 controls the width of the edge pulses from variable width one shot 16.

The AND gate 10 opens only during the time when two widened edge pulses overlap (i.e. those portions of the widened edge pulses from respective channels which arrive at the AND gate 10 in coincidence. Two identical scenes will open the AND gate for all pulses and produce the same integrated output independent of the nature of the scenes.

A circuit for a complete variable width detector is given in FIG. 5. The values for components are shown by way of example. $A_1$ is a gated amplifier. The 5K potentiometer at amplifier A is set so that only video signals (not blanking pulses) are amplified and passed to amplifier $A_2$. The video signal from TV camera is shown as A, FIG. 6, for example. $A_2$ is a unity gain amplifier designed to cause the video DC average to appear as zero volts at its output. The output of this amplifier therefore swings from negative to positive or vice versa at the edges of the video pulses, shown as B in FIG. 6. $C_1$ is a comparator with hysteresis. Whenever its input voltage swings more than a few millivolts in either direction its output changes state, as shown by C of FIG. 6. $C_2$ is another comparator used as an operational amplifier without latchup. Any change of state of $C_1$ produces a negative going pulse at the output of $C_2$, see D of FIG. 6, the width fixed by differentiators at its input. $C_3$ is a one shot multivibrator, the width of its output pulse (see E of FIG. 6) being a function of the voltage at the output of amplifier $A_3$. $A_3$ in turn produces the voltage $E_r$ necessary to keep the integrated output voltage of $C_3$ equal to the set voltage $E_s$.

The variable width one-shot formed by MOSFET F and comparator $C_3$ acts somewhat unlike an ordinary one-shot (see FIGS. 5 and 7). Point B charges through F. to 2.6V limited by diode $D_2$ (curve B of FIG. 7). Since point A is at a constant 2V the output of $C_3$ is normally negative (curve C of FIG. 7). Negative input pulses (curve A, FIG. 7) causes $D_1$ to conduct causing the 50 pf. capacitor to charge instantly to about −0.5V. C then switches to its positive output state. At the end of the pulse F again attempts to charge the 50 pf. capacitor positive with a constant current determined by its gate voltage. When point B reaches a few millivolts positive with respect to point A the comparator changes back to its negative state. Note that the pulse length is determined by the gate voltage.

A more conventional one-shot would not trigger on a second input pulse if it came during its "on" time. Hence some of the close spaced video information would be neglected. In this circuit all pulses recharge the capacitor. Hence very close spaced input pulses cause extended output pulses with a corresponding saving of information.

Using this method it is not necessary to check all correlation peaks to be sure of the maximum. Identical scenes, or scenes with identical edges, will always produce a fixed output voltage (e.g., 3.0 volt). Exact correlation is obtainable almost instantly and chances of error are very much reduced. The device can be used as one part of a TV correlator such as described in aforementioned application Ser. No. 789,086 video correlator. It can be substituted directly for the edge detector in such an analog instrument.

What we claim is:

1. A variable width video edge detector comprising:
    a. a first video channel circuit which transmits video pulses from a scanned live scene, and a second video channel circuit which transmits video pulses from a scanned reference scene,
    b. a gate means to which pulses from said first and second video channels are fed and which opens only during the time when pulses from both said channels arrive in coincidence at said gate means,
    c. each said video channel circuit comprising:
        1. a television camera for scanning a scene,
        2. a detector means connected to said television camera for detecting the edges of video pulses,
        3. a variable width one shot means connected to said edge detector means for producing a single pulse for every video input pulse,
        4. an operational amplifier circuit connected to said variable width one shot means for controlling the width of the edge pulses from the output of said variable width one shot means.
    d. said gate means operable to open for all pulses from said first and second video channels when the scanned live scene and reference scene are identical.

2. A device as in claim 1 wherein said edge detector comprises a gated amplifier biased to allow only amplified signals to pass to a unity gain amplifier, said unity gain amplifier in turn causes the average video DC signal to appear as zero volts at its output thus causing its output to swing from one polarity to another at video pulse edges, the output of said unity gain amplifier being fed to a first comparator with hysteresis whose output changes state as the input changes in either direction, the output of said first comparator fed to a second comparator which produces a negative going output pulse whenever the output of said first comparator changes state.